April 21, 1953
H. E. KARIG
2,635,581
FLUID SERVO APPARATUS
Filed Jan. 27, 1949
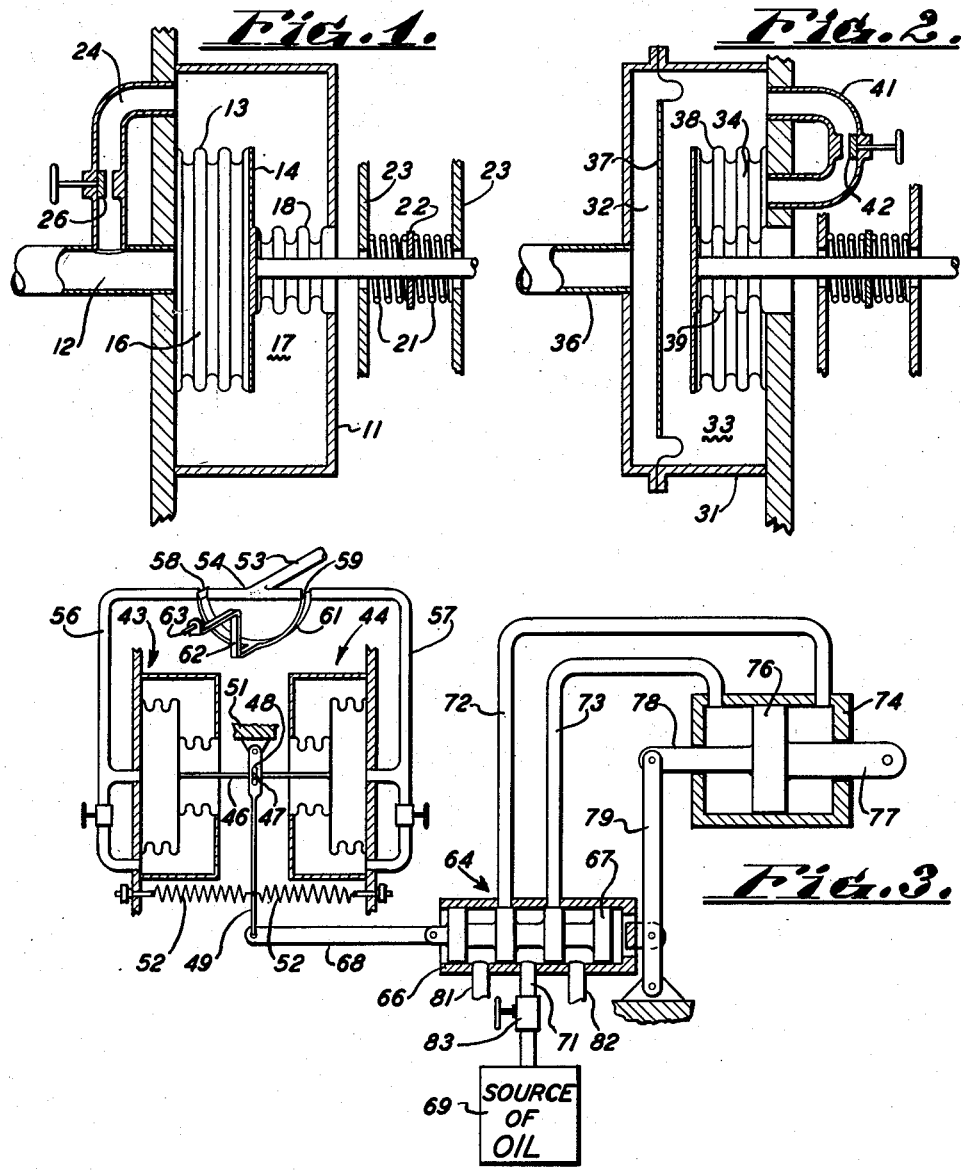
INVENTOR.
HORACE E. KARIG
BY
ATTORNEY Patented Apr. 21, 1953

2,635,581

UNITED STATES PATENT OFFICE 2,635,581

FLUID SERVO APPARATUS

Horace E. Karig, Pasadena, Calif.

Application January 27, 1949, Serial No. 73,211

2 Claims. (Cl. 121—38)

(Granted under Title 35, U. S. Code (1952), sec. 266)

This invention relates to a fluid servo system; that is to say, to an apparatus in which the flow of fluid thru a system of conduits is employed to transmit and preferably also amplify in power the movement of a control member.

It is an object of this invention to provide a fluid servo system, the output signal from which will be a combined function representing both the input signal and the rate of change of the input signal.

It is another object of this invention to provide a push-pull fluid servo system, in which a pair of substantially identical control devices are so interlinked and are so fed with suitable fluid pressure signals that their output acts in a common sense or direction to transmit to an output member a signal which varies both with the input signal and with the rate of change of the input signal.

It is a further object of this invention to provide in a fluid servo system a valve member and a servo mechanism controlled thereby, and linkage means between the two, so that the servo mechanism may be caused to occupy a position corresponding to that of a movable member forming a portion of the valve.

It is another object of the instant invention to provide a fluid servo or control system in which the output signal is responsive to both the input signal and the rate of change in the input signal, and means in the system for selectively attenuating higher frequency responses which result from high frequency rate responses in the signal, thereby rendering the system more stable.

Other objects and many of the attendant advantages of the instant invention will be readily appreciated as the same becomes better understood by reference to the following description.

One of the important elements of the system of the instant invention is an apparatus for deriving a force proportional simultaneously to the pressure of a fluid (which pressure represents an input signal) and also to the rate of change of this pressure. This apparatus comprises a pair of opposed, expansible chambers separated by suitable diaphragm means, so that as one chamber enlarges, the other automatically ensmalls. The chambers are so arranged that the pressure sensitive area of the wall facing one chamber is greater than that facing the other, so that for equal pressure areas in both chambers, the forces against the two sides of the wall will be unequal. An input conduit is connected to the chamber having the smaller wall area, and a by-pass conduit is connected from the input conduit to the other of the two chambers. The by-pass conduit has a restriction (preferably adjustable) therein, so that upon a sudden change in input pressure, the fluid pressure in the second of the two chambers does not change as rapidly as that in the first. The first chamber, having direct communication with the input conduit, is thus sensitive to rate of change of input pressure, while the second chamber, which is fed only thru the restricted conduit, is responsive to the fundamental signal, i. e., to the pressure itself.

An output rod is secured to the wall or diaphragm separating the two chambers, and extends outside the apparatus. Suitable resilient biasing means, having the property of increasing the opposing force as the rod is moved from a neutral position, is connected to the rod, so that the output position of the rod becomes a function of both the rate of change of input pressure and of the input pressure itself, i. e., the fundamental.

Since the control fluid in such an apparatus as described above must be compressible, e. g., a gas such as air, it may be desirable in certain cases to insert a diaphragm between the input conduit and the device itself, so that an incompressible fluid, e. g., a liquid such as oil, may be used in the input conduit, its pressure being transmitted thru the diaphragm to air, which then flows back and forth between the two opposed chambers.

The combined, fundamental and rate responsive device described above is conveniently employed in a push-pull system, in which two such devices are placed in opposition, their respective output rods feeding a common output member, and their input conduits being so controlled in push-pull fashion that as pressure in one device increases, pressure in the other decreases. The common output member is so connected to the two output rods of the opposed devices that an output movement in a common sense, or direction, is derived, in typical push-pull fashion. For amplification of signal power, this common push-pull output member is preferably connected to a valve in a hydraulic system, this valve controlling the application of fluid to a hydraulic servo such as a cylinder and piston.

The hydraulic valve may comprise a pair of cooperating members such as a cylinder and a reciprocating piston, one of the members, for example, the piston, being reciprocated by the output member from the fundamental-and-rate-responsive devices described above. The valve serves to control admission of oil selectively to either end of a hydraulic servo cylinder, depending on the position of the valve piston. In certain cases it may be desired that the movement of the hydraulic servo be proportional to the integral of the output from the rate responsive devices. In other cases, however, integration is not desired; and to that end it is required that some means be provided for stopping flow of fluid into the hydraulic servo cylinder which the servo piston has moved a distance corresponding to the output signal from the rate responsive devices. To such an end, a feedback link is connected between the hydraulic servo piston and the cylinder or casing of the valve, causing the casing to move in the same direction as the valve piston, thereby compensating for the movement of the piston. In this way, integration of the signal is avoided, and the ultimate output signal at the servo becomes directly a function of the input signal and the rate of change of the input signal.

Specific embodiments of apparatus constructed in accordance with the instant invention will now be described with reference to the accompanying drawing, wherein:

Fig. 1 represents schematically a combined fundamental and rate responsive device forming an important component of the complete system of the instant invention;

Fig. 2 illustrates how the device of Fig. 1 may be modified to accommodate it for receiving pressure signals from an incompressible fluid such as oil; and Fig. 3 illustrates a complete fluid servo system employing both air and oil, to achieve the final result of a high power output signal proportional simultaneously to both the fundamental and rate of change of a low power input signal.

In Fig. 1, 11 denotes a housing or casing to which is connected an input conduit 12 adapted to transmit to the housing 11 a compressible fluid such as air. The pressure of the air represents the input signal which is to be operated on by the device in such a fashion that an output signal is derived proportional simultaneously to both the fundamental and rate of change of the air pressure in the input conduit 12. A bellows 13, closed by a wall 14, and communicating with the input conduit 12, forms a first expansible chamber 16 within the housing 11. The remainder of the housing 11 constitutes a second expansible chamber 17, so arranged that as the chamber 16 enlarges, thereby moving the wall 14 to the right, the chamber 17 must automatically become smaller.

To derive an output that is proportional both to the fundamental and the rate of change of the input signal, it is necessary that the pressure effective areas on the two sides of the wall 14, exposed to the chambers 16 and 17, respectively, be different. To that end, a smaller bellows 18 is mounted to the wall 14, and extends thru the chamber 17 to the wall of the housing 11, where it communicates with atmosphere, thereby reducing the area of the wall 14 which is exposed to the chamber 17 and making the pressure-sensitive area on the side of the chamber 16 greater than that facing the chamber 17.

An output rod 19 connected to the outside face of the wall 14 extends thru the interior of the bellows 18, and is resiliently biased to a suitable neutral position by means of a pair of springs 21, compressed between a washer 22 fixed to the rod 19, and a pair of fixedly mounted walls 23. Where resilient metal bellows are used at 13 and 18, the springs 21 may be omitted.

Fluid is admitted to the expansible chamber 17 thru a conduit 24, extending from the input conduit 12 to the annular area around the bellows 13. An adjustable restriction 26 is placed in the conduit 24, so that air passing from the input conduit 12 into the chamber 17 is throttled, whereby an appreciable time is required for the pressure in the chamber 17 to equalize with that in the chamber 16, following a change in applied pressure from the conduit 12.

The operation of the device of Fig. 1 is substantially as follows: Assume that a given super-atmospheric air pressure exists in the input conduit 12. This pressure also exists in the two chambers 16 and 17, but since the former is active upon a greater area of the wall 14, the rod 19 is pressed to the right a predetermined amount until the springs 21 are compressed sufficiently to match this force. The rod 19 thus comes to rest at a predetermined position.

Now assume that the pressure in the input conduit 12 increases. This increase is immediately transmitted into the chamber 16 and causes the wall 14 to move to the right. Pressure in the chamber 17, however, does not increase immediately because of the restriction 26. As the air flows past the restriction 26 thru the conduit 24 and into the chamber 17, pressure in the chamber 17 gradually builds up and slowly returns the wall 14 toward the left. However, even after pressure has equalized between the chambers 16 and 17, the new increased pressure causes the rod to come to rest at a position somewhat to the right of what it was before, because of the differential in wall-effective areas between the chambers 16 and 17.

The net result is that upon increase in pressure, i. e., when the input signal increases, the rod 19 moves suddenly to the right, overshooting its final position, and gradually returning to the left until it occupies its new fundamental position. This represents an output signal which is proportional both to the fundamental of the input signal and also to the rate of change, or first time derivative of the input signal.

Under certain circumstances, it may be desirable to transmit the pressure signals to the device of Fig. 1 thru an incompressible fluid such as oil. In this case, the modification shown in Fig. 2 may be employed to advantage. In this case, the housing 31 is divided into three chambers: 32, 33 and 34, the first communicating directly with the inlet conduit 36 and being separated from the chamber 33 by a diaphragm 37. In this way the two opposed chambers 33 and 34 may be filled with air, or other compressible fluid, while pressure may be applied thereto by oil in the chamber 32 thru the diaphragm 37. The chambers 33 and 34 are separated by a bellows 38, and area differential being achieved as in Fig. 1 by a smaller bellows 39.

In the Fig. 2 modification it is convenient to provide the by-pass conduit 41, having the adjustable restriction 42, directly between the two chambers 33 and 34.

Operation of the device of Fig. 2 is the same as that of Fig. 1 except that the input pressure signal in the conduit 36 is transmitted by means of oil pressure against the diaphragm 37, and then against the air in the chambers 33 and 34.

Turning now to the complete system, Fig. 3, a pair of fundamental and rate responsive devices, each similar to that illustrated in Fig. 1, is illustrated at 43 and 44, respectively. The devices at 43 and 44 are juxtaposed and faced toward each other in push-pull fashion, so that a common output rod 46 may be employed extending between the respective movable walls of the devices 43 and 44. The rod 46, at its midpoint has a pin 47, extending thru a slot 48 in a lever 49 pivoted at 51. The lever 49 is biased to a suitable neutral position by means of springs 52.

Air supply for the two devices 43 and 44 comes from a conduit 53 which is bifurcated at 54 into two branches 56 and 57, supplying the two devices 43 and 44, respectively. The two branches 56 and 57 are broken at 58 and 59, respectively, so that the air must span an open gap to continue its flow into the two devices 43 and 44.

A valve means is pivotally mounted to control flow of fluid past the breaks 58 and 59 in push-pull fashion. This valve means assumes the form of an arcuate vane 61, pivotally mounted by means of an arm 62 to a shaft 63, disposed on an axis extending thru the bifurcation 54. As the shaft 63 is caused to oscillate by virtue of an input signal, the vane 61 likewise oscillates in such a manner that one end of the vane progressively blocks one of the branches 56—57 while simultaneously progressively opening the other branch. For example, when the shaft 63 pivots slightly clockwise in Fig. 3 causing the arcuate vane 61 to do likewise, a greater portion of the break 58 is covered by the vane 61, and a lesser portion of the break 59 is covered by the other end of the vane 61. Thus, an increased amount of air is admitted to the conduit 57, while a decreased amount is admitted to the conduit 56. The output rod 46 thus receives a signal in the same sense from both the devices 43 and 44; i. e., the pressure changes in the conduits 56 and 57 are both in such direction as to cause the output rod 43 to move to the left in Fig. 3. As shown, the construction of the vane 61 and associated parts is such that the shaft 63 may rotate thru a full 360 degrees if so required.

The force or power derivable from such a device as thus far described in Fig. 3 is generally rather low, and it is desirable to amplify this force before it is actually applied to a response member such as a vehicle rudder. To this end, a valve 64 is provided having a cylinder or casing 66 and a piston or valve member 67 reciprocable within the casing 66. The valve member 67 is linked to the arm 49 by means of an arm 68. From a source 69 of fluid such as oil under pressure, oil is applied to the interior of the casing 66 by means of an input conduit 71. A pair of output conduits 72 and 73, positioned to selectively receive oil from the source 69 in accordance with the relative position between the valve member 67 and the casing 66, are connected to apply oil to the respective ends of a servo cylinder 74 in which reciprocates a piston 76, having an output rod or arm 77 extending thru the end wall of the cylinder 74.

In order that the movement of the output rod 77 not be the integral of the movement of the valve member 67, it is necessary to cause the casing 66 to move in compensation, so that the actual output of the rod 77 will be proportional directly to the fundamental movement of the valve 67, and not to the integral thereof. To this end, a rod 78 extends from the other end of the piston 76 thru the other wall of the cylinder 74, and connects by means of a feedback link 79 with the valve casing 66.

The operation of the hydraulic portion of the system of Fig. 3 will now be briefly discussed. Under equilibrium conditions, the piston 76 occupies a position corresponding directly to that occupied by the output member or rod 49 of the signal rate deriving devices 43 and 44. In this case, the valve member 67 is in such position in the casing 66 that both of the valve output conduits 72 and 73 are blocked, and there is no flow of oil from the source 69. Suppose now that the member 49 should move to the right in Fig. 3. This causes a corresponding movement of the valve member 67, thereby exposing the conduit 73 to oil under pressure from the source 69, and simultaneously exposes the conduit 72 to the exhaust conduit 81, by means of which oil is evacuated from the casing 66. Oil under pressure thus flows thru the inlet conduit 71, valve casing 66, conduit 73, and into the left hand side of the cylinder 74, forcing the piston 76 to the right, while oil is evacuated from the right hand side of the cylinder 74 thru the conduits 72 and 81. Were it not for the feedback link 74, this action would continue indefinitely, thereby causing the output rod 77 to respond as the integral of the movement of the valve member 67. However, in the instant invention, as the piston 76 moves to the right, it causes the casing 66 to also move to the right, thru the linkage 78, 79, thereby gradually covering the openings of the conduits 72 and 73 which were exposed by the movement of the valve member 67, until these conduits are finally closed completely. The piston 76 is thus caused to assume a new position corresponding directly to the new position of the output rod 49.

Were the rod 49 to move to the left, a converse operation would take place, with oil being supplied to the cylinder 74 thru the conduit 72, and being evacuated thru the conduit 73 and the exhaust conduits 82 in the valve casing 66.

It is to be understood that the operative connections to the two members 66 and 67 of the valve 64 may be reversed if desired. That is to say, the input linkage 68 may be connected to the valve casing 66 instead of to the valve member 67, and the feedback link 79 connected to the valve member 67 instead of to the casing 66. The essential operation of the valve 64 will still be substantially unchanged.

In a system as described in connection with Fig. 3, it often occurs that undesirable magnification of high frequency rate response signals occurs in the devices 43 and 44, so that the high frequency components in the oscillation of the rod 49 are disproportionately large. It is, therefore, desirable that some means be attained for discriminating selectively against high frequency components while allowing the lower frequency oscillations to come thru unattenuated. This is effected in accordance with the instant invention by inserting somewhere in the oil conduit system feeding the cylinder 74 a suitable throttle valve, by means of which the rate of flow of oil from the source 69 may be limited. This may be done in either of the conduits 71, 72 or 73 or in more than one of these conduits. In the example shown in Fig. 3, this throttle valve is shown at 83 interposed in the inlet conduit 71.

The action of the valve 83 is substantially as follows: assume that a high frequency signal is obtained on the output rod 49 so that it moves rapidly to the right. This exposes the port feeding the conduit 73, so that the piston 76 starts to move to the right. However, by virtue of throttling action of the valve 83, oil can enter the left hand side of the cylinder 74 at only a predetermined rate, so that the rate of movement of the piston 76 to the right is thereby limited to a predetermined maximum. Before the piston 76 has an opportunity to move to the full excursion demanded of it by the rapid signal from the rod 49, the latter returns to the left by virtue of the short periodicity (high frequency) of the signal under consideration, thereby closing the conduit 73; and, if the excursion is large enough, exposing the conduit 72 to the action of the high pressure oil from the source 69. It will thus be seen that for such a rapid oscillation of the output rod 49, the piston 76 is unable to follow as rapidly as demanded of it by the rod 49. In this way, high frequency signals appearing on the rod 49 are attenuated directly in proportion to the frequency, the lower limit frequency of this attenuation being determined by the setting of the valve 83.

No attenuation is experienced for low frequency signals, because as the valve 67 moves slowly to the right (or left, as the case may be), the opening exposed to the conduit 73 is rather small, and it is this opening rather than the restriction of the valve 83 which is the controlling factor in determining the speed of movement of the piston 76. Thus, for low frequencies the piston 76 is able to follow faithfully the movement of the rod 49, and the valve 83 has not restrictive effect.

Operation

For a comprehensive understanding of the over-all operation of the system disclosed in Fig. 3, a complete cycle of operation will now be described. Under a steady state condition, air flows steadily thru the conduit 53 into the two branches 56 and 57, past the breaks 58 and 59, and enters the two rate responsive devices 43 and 44. The pressure in these two devices will thus be of such magnitude that the output rod 49 assumes a defiinite position, depending directly upon the position of the input signal vane 61. Likewise, the valve member 67 and the piston 76 assume positions corresponding directly to that of the rod 49, and thus of the input vane 61. We thus find the ultimate output rod 77 residing at a position which is a unique, single valued function of the position of the vane 61.

Assume now that a signal from the shaft 63 causes the arcuate vane 61 to pivot clockwise. This exposes more of the gap 59 and less of the gap 58 to the air stream from the conduit 53. Pressure is thus increased in the device 44, and decreased in the device 43. The output rod 49 moves to the left, overshooting its final value, and then returning to the right where it finally comes to rest at a position corresponding directly to the position of the shaft 63. The overshooting is due to the rate responsive nature of the devices 43 and 44, as described hereinbefore in connection with the description of Fig. 1. The net result is that the output rod 49 in Fig. 3 moves in accordance with a signal which is directly proportional to both the fundamental and first time derivatives of the signal applied thru the shaft 63. When the shaft 63 has stopped moving for an appreciable time so that steady state conditions are again imposed, the output rod 49 will have assumed a steady state condition directly proportional to the new position of the shaft 63.

Whatever the movement of the rod 49 is, it will be followed directly by the valve member 67 thru the arm 68. When the rod 49 moves to the left, the piston 67 likewise moves to the left, exposing the conduit 72 to the high pressure oil from the source 69, forcing the piston 76 to the left until the casing 66 is compensatorily moved thru the linkage 79 a distance sufficient to close the port feeding the conduit 72, whereupon motion of the piston 76 stops at its new position corresponding to that of the valve member 67. The piston 76 follows faithfully the movement of the rod 49 including the rate responsive overshoot, except that when the overshoot occurs at a high frequency beyond the limiting capacity of the throttle valve 83, then such high frequency is attenuated, and the full swing of the rod 49 is not obtained in the piston 76.

The net result is as follows: The output member 77, secured to the piston 76, follows the input signal and the rate of change of the input signal applied to the vane 61 faithfully, except that high frequency components in the movement of the rod 49, introduced usually thru the rate responsive devices 43 and 44, are not followed faithfully, but are attenuated, by the piston 76, the attenuation increasing with increasing frequency.

It is to be understood that either of the rate responsive devices shown in Fig. 1 or 2 may be substituted for the double bellows arrangement 43—44 incorporated in Fig. 3. In such case the signal may come from any device capable of delivering a pneumatic pressure proportional to the signal to be amplified.

Alternatively the variable pneumatic pressure may be achieved by using half of the vane 61 to regulate a single conduit supplying either of the devices in Fig. 1 or 2.

Obviously, many modifications and variations of the present invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A pressure sensitive control device comprising: a pair of chambers, a diaphragm for each chamber dividing the same into two compartments, the pressure sensitive area on one side of diaphragm being greater than on the other, and a restriction connecting the compartments; a source of fluid under pressure; two conduits respectively connecting said source to a compartment of each chamber; valve means operable to increasingly restrict flow thru one of said conduits while permitting increased flow thru the other; and an output member connected in push-pull relation to both diaphragms.

2. A pressure sensitive control device comprising a pair of chambers each having a movable wall dividing the chamber into two compartments with a greater pressure sensitive area on one face of the wall than on the other, an adjustable orifice in each said wall connecting its two compartments, a source of fluid pressure, two conduits connecting said source respectively to one compartment of each chamber, valve means operable to increasingly restrict flow thru one of said conduits while decreasingly restricting flow thru the other of said conduits, a movable output member, and a common actuating member connecting both said walls to said output member in push-pull relation.

HORACE E. KARIG.

(References on following page)

References Cited in the file of this patent

UNITED STATES PATENTS

| Number | Name | Date |
|---|---|---|
| 1,978,502 | Moller | Oct. 30, 1934 |
| 2,129,586 | Moller | Sept. 6, 1938 |
| 2,148,230 | Berger | Feb. 21, 1939 |
| 2,154,718 | Bannon | Apr. 18, 1939 |
| 2,177,674 | Schweizer | Oct. 31, 1939 |
| 2,221,150 | Rebeski | Nov. 12, 1940 |
| 2,344,547 | Halford | Mar. 21, 1944 |
| 2,374,708 | Shoults | May 1, 1945 |
| 2,379,306 | Larson | June 26, 1945 |
| 2,453,328 | Lee | Nov. 9, 1948 |
| 2,475,894 | Hermanny | July 12, 1949 |
| 2,516,333 | Moore | July 25, 1950 |